US011916313B2

(12) United States Patent
Tu et al.

(10) Patent No.: US 11,916,313 B2
(45) Date of Patent: Feb. 27, 2024

(54) APPRESSED ANTENNA

(71) Applicant: QuantumZ Inc., Kaohsiung (TW)

(72) Inventors: Kun-Yen Tu, Kaohsiung (TW); Meng-Hua Tsai, Kaohsiung (TW); Wei-Ting Lee, Kaohsiung (TW); Sin-Siang Wang, Kaohsiung (TW)

(73) Assignee: QuantumZ Inc., Kaohsiung (TW)

( * ) Notice: Subject to any disclaimer, the term of this patent is extended or adjusted under 35 U.S.C. 154(b) by 109 days.

(21) Appl. No.: 17/707,928

(22) Filed: Mar. 29, 2022

(65) Prior Publication Data

US 2023/0033109 A1 Feb. 2, 2023

(30) Foreign Application Priority Data

Jul. 27, 2021 (TW) ................................ 110127565

(51) Int. Cl.
*H01Q 1/42* (2006.01)
*H01Q 9/04* (2006.01)

(52) U.S. Cl.
CPC ............ *H01Q 9/0414* (2013.01); *H01Q 1/42* (2013.01); *H01Q 9/0421* (2013.01)

(58) Field of Classification Search
CPC ...... H01Q 9/0414; H01Q 1/42; H01Q 9/0421; H01Q 1/24; H01Q 1/38; H01Q 9/42
See application file for complete search history.

(56) References Cited

U.S. PATENT DOCUMENTS

2009/0146906 A1* 6/2009 Anguera Pros ........ H01Q 1/243 343/906
2018/0090840 A1* 3/2018 Yu ............................ H01Q 1/52

FOREIGN PATENT DOCUMENTS

CN 103401059 B 8/2015
CN 106299676 B 6/2019

* cited by examiner

*Primary Examiner* — Hai V Tran
*Assistant Examiner* — Michael M Bouizza
(74) *Attorney, Agent, or Firm* — CKC & Partners Co., LLC

(57) ABSTRACT

An appressed antenna includes an antenna housing and a metal shell. The antenna housing comprising a housing and a planar antenna, where the planar antenna is bent with one part folded onto the inner surface of the housing and other part pressed onto the outer surface of the housing. The antenna housing is sleeve fitted to the metal shell with a gap between for the planar antenna to radiate. In this all-metal environment, the position of the antenna is close to the gap opening will increase radiation efficiency. By having at least a branch at the tail end of the appressed antenna, the appressed antenna can have a good return loss and antenna gain.

12 Claims, 5 Drawing Sheets

APPRESSED ANTENNA

CROSS-REFERENCE TO RELATED APPLICATION

This application claims the benefit of Taiwan Patent Application No. 110127565, filed on Jul. 27, 2021, which is hereby incorporated by reference for all purposes as if fully set forth herein.

BACKGROUND

Technical Field

This application relates to antenna technologies, and specifically, to an appressed antenna structure.

Related Art

Antenna transmission is susceptible to interference from metal, therefore a non-metal clearance area is usually reserved for the antenna when a product is designed. Placement of metal objects around this area is avoided to minimize affecting radiation efficiency of the antenna or even causing the antenna to fail.

Existing FR4 board is a hard, and an antenna is mostly deigned in a horizontal plane. If the antenna needs to be designed in a vertical plane, an additional three-dimensional conductive part is added. Or the antenna may be designed into two parts: a horizontal part and a vertical part connected to be an antenna. However, such antenna designs require additional procedures, which increase complexity in manufacturing.

Smart home concept is becoming popular and home appliance switches are intended to be remotely controlled. There is an increasing demand for antennas. Smart home appliances are connected through antennas, and users may remotely control functions of such appliances from terminals such as mobile phones and computers from remote locations.

In the China Patent No. CN201510288532.4, a mobile terminal with an all-metal shell and an antenna system of the same are disclosed. The antenna system with an all-metal shell includes the metal shell, feed points, and ground points. The all-metal shell includes three sections of metal shell in the same plane and connected by a non-metallic material. On an inner surface of the all-metal shell, a feed point and a corresponding ground point are set at a joint between two adjacent sections of metal shell. In this patent, the all-metal shell of the mobile terminal is designed with three sections joint by the non-metallic material. Such design avoids negative effect of a metal shell on radio signal radiation.

In the China Patent No. CN201310323272.0, an antenna device with an all-metal shell is disclosed, which includes a metal shell installed on the back of a communication device, an antenna branch, and feed points. A metal frame extending from the back of the communication device to a side is arranged at a peripheral edge of the metal shell. The metal shell is divided into a first metal shell, a second metal shell, and a third metal shell. The feed points are located between the first and second metal shell, and between the second and third metal shell respectively. A first antenna branch arranged in the first metal shell and a second antenna branch arranged in the third metal shell are each connected to a radio signal source of a PCB mainboard arranged on the second metal shell, and correspondingly feed signals into the first metal shell and the third metal shell through the feed points. This patent adopts a three-section all-metal shell structure. The metal frame becomes a part of the antenna. The first metal shell and the third metal shell can be both used as the antennas, which has advantages of an ultra-wide low-frequency bandwidth and an ultra-wide high-frequency bandwidth.

The above-mentioned two patents do not have negative effect on the radio signal radiation of the mobile terminal, and have the advantages of the ultra-wide low-frequency bandwidth and the ultra-wide high-frequency bandwidth. Smart home appliances may be obtained simply by adding a connection module and an antenna to original home appliances. However, home appliances often have a lot of metal parts that consequently cause lots interferences and restrictions to antenna designs. Smart switches provide an alternative to remote control appliances. The appearance of a smart switch may also be made of metal, and the antenna may be required to be inside the switch. The present invention provides an appressed antenna for such purpose.

SUMMARY

The present invention discloses an appressed antenna with a planar inverted-F antenna (PIFA) operating at 2.4 GHz and a metal shell not affecting radiation ability of the antenna. The planar antenna is made with LCP soft board that is not only stable, but also bendable. Therefore, the planar antenna may be disposed in a vertical plane, so that the antenna can be proximate to an opening to improve the radiation ability.

The present invention discloses an appressed antenna including an antenna housing and a metal shell. The antenna housing comprises of a housing and a planar antenna, where the planar antenna is bent with one part folded onto the inner surface of the housing and the other part pressed onto the outer surface of the housing. There is a gap when the antenna housing is sleeved into the metal shell to allow antenna radiation, and the metal shell may have a slot opened for improved radiation.

The planar antenna is made of LCP material or other soft materials. There is no restriction on the material of the housing. The metal shell is made of metal or surface treated with metal material.

The planar antenna comprises a ground terminal, a feed terminal, and antenna branches. The planar antenna is bent, the ground terminal and the feed terminal are folded onto the inner surface of the housing, and the branches are pressed onto the outer surface of the housing.

The ground terminal, feed terminal, and antenna branches of the planar antenna are wrapped with a protective film.

The planar antenna is inverted-F shaped and designed based on Zigbee to operate in the frequency of 2.4 GHz to 2.46 GHz.

The size of the antenna housing is smaller than the size of the metal shell. The antenna housing is sleeve fitted in the metal shell. The distance between the antenna housing and the metal shell is greater than 0 after being fitted.

The extending direction of the antenna branches correspond to that of the gap between the antenna housing and the metal shell or the slot opened on the metal shell. The gap or the slot on the metal shell partially or completely exposes the antenna branches when the antenna housing and the metal shell are fitted.

The benefits of the present invention are as follows: The appressed antenna is designed for applications in an all metal environment. The planar antenna is designed in an inverted-F shape. The ground terminal and the branches provide a good matching for the antenna. The LCP thermoplastic property allows the antenna to be bent to form in a vertical plane, and therefore to a position close to the gap or the slot opening of the metal shell to increase the radiation efficiency. The inverted-F planar antenna has a good return loss and a good antenna gain, therefore the appressed antenna can work effectively in the all metal environment.

DETAILED DESCRIPTION

Figure 2:
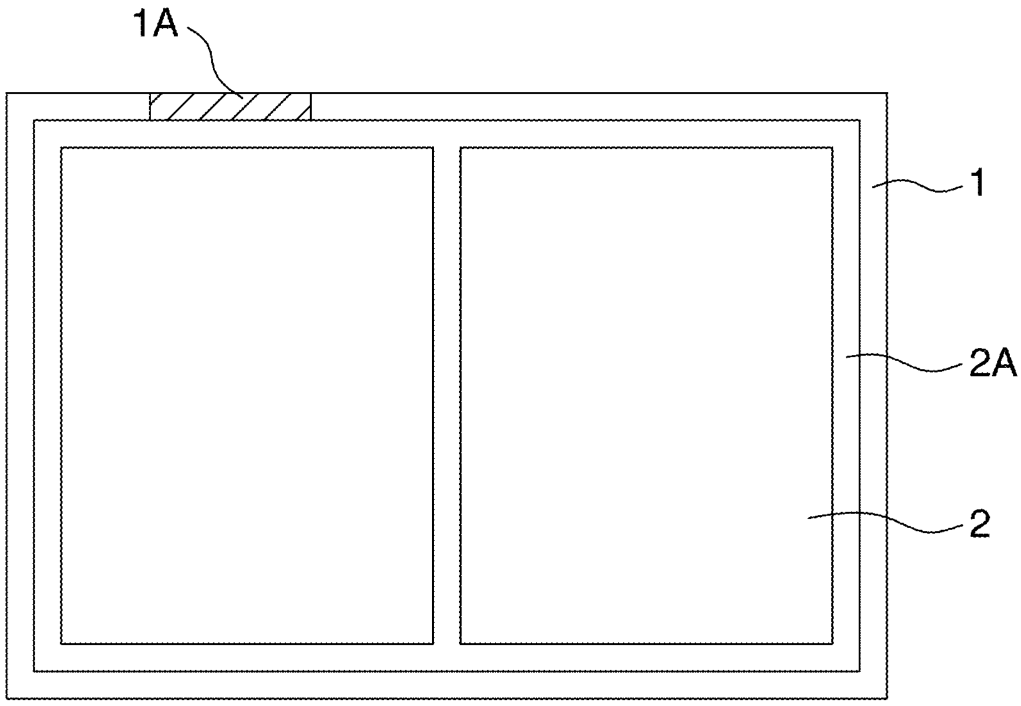
FIG. 2 is a schematic structural diagram of a metal shell of a smart switch.
Figure 3:
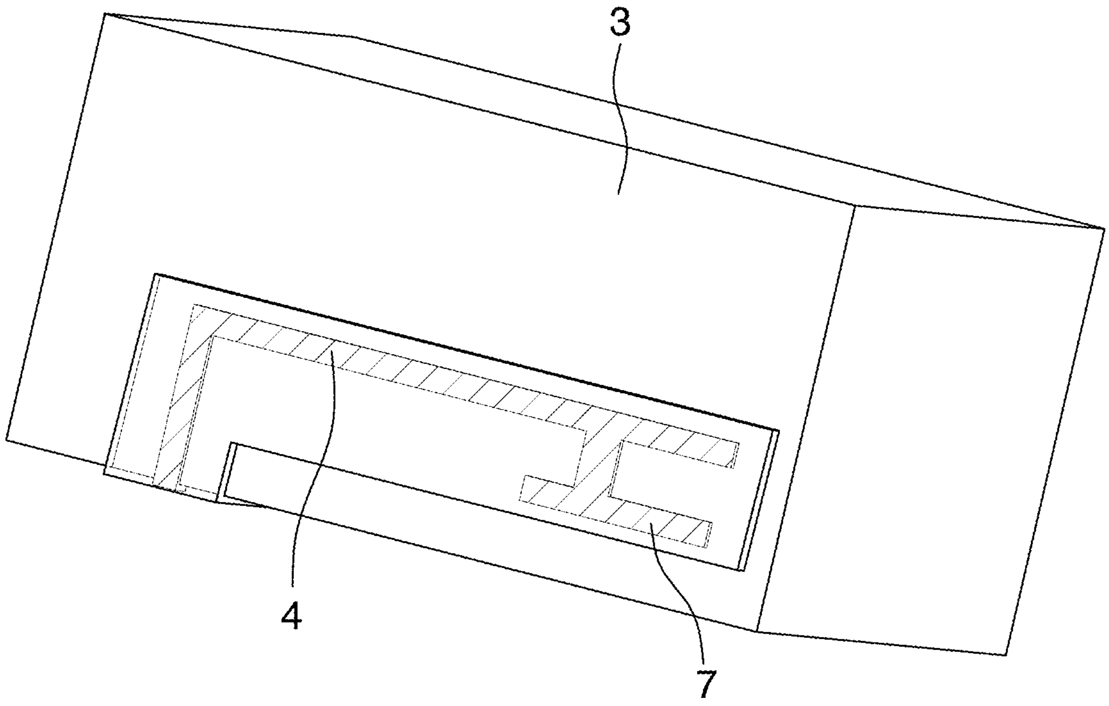
FIG. 3 is a front view of an antenna cover plate.
Figure 4:
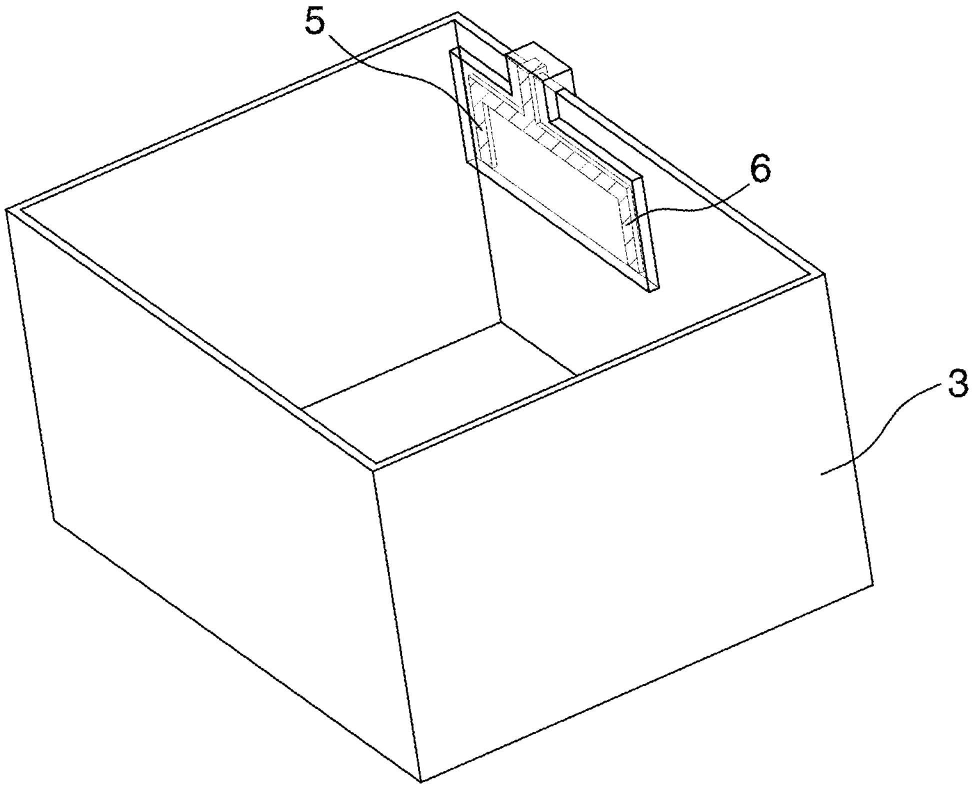
FIG. 4 is a schematic diagram of the inside of the antenna cover plate.

Referring to FIG. 2, FIG. 3 and FIG. 4, the present invention provides an appressed antenna including a metal shell 1 and an antenna housing 2. The antenna housing 2 includes a housing 3 and a planar antenna 4, where the planar antenna 4 is bent, one part is folded onto the inner surface of the housing 3, and the other part is pressed onto the outer surface of the housing 3. The antenna housing 2 is sleeved into the metal shell 1 and the distance there between is greater than 0, hence at least a gap 2A is maintained.

The planar antenna 4 is made of a soft material and bent. In this embodiment, the planar antenna 4 contains LCP material.

In this embodiment, the planar antenna 4 includes a ground terminal 5, a feed terminal 6, and an antenna branch 7. The planar antenna 4 as shown in FIG. 3 and FIG. 4 is bent, the ground terminal 5 and the feed terminal 6 are folded onto the inner surface of the housing 3, and the branch 7 is pressed onto the outer surface on a side of the housing 3.

Figure 9:
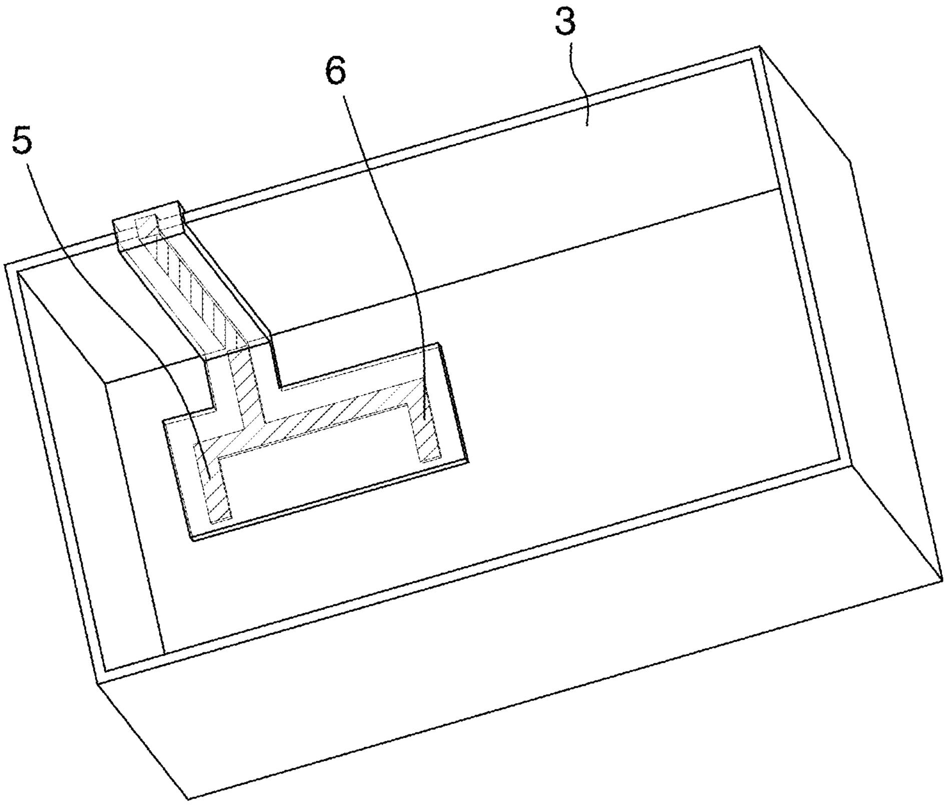
FIG. 9 is a schematic diagram of an antenna placed on an inner bottom side of the metal shell.

In some embodiments, as shown in FIG. 9, a planar antenna 4 is bent, and a ground point 5 and a feed point 6 are folded onto the inner bottom surface of the housing 3, and the branch 7 is pressed onto a top surface of the housing 3.

In some embodiments, the planar antenna 4 is bent, the ground terminal 5 and the feed terminal 6 are folded onto the inner surface of the housing 3, and the branch 7 is pressed to the outer surface on the edge wall of the antenna cover plate 3.

Figure 1:
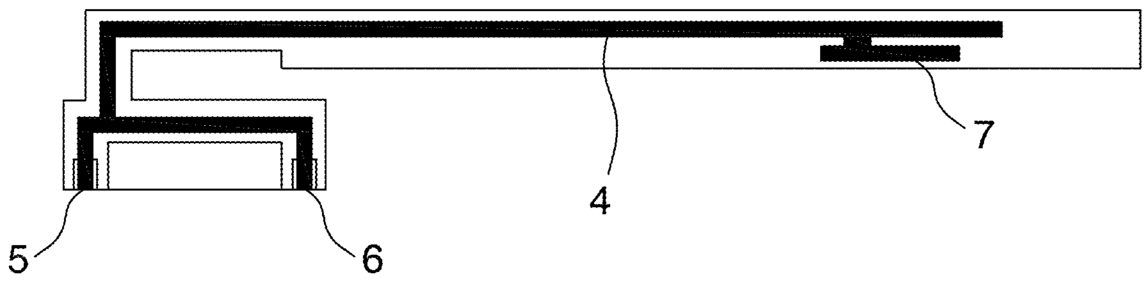
FIG. 1 is a structural diagram of an antenna according to an embodiment of this application.

In this embodiment, the planar antenna 4 is designed in a planar inverted-F antenna (PIFA) shape. As shown in FIG. 1, the ground terminal 5 and the branch 7 at the tail end of the planar antenna 4 provide a good antenna matching. The planar antenna 4 is designed with LCP material for the LCP material has properties of low loss and low water absorption, and is capable of being shaped after being heated, allows more stable properties and bendable applications of the planar antenna 4.

In this embodiment, the antenna path of the planar antenna 4 is wrapped with a protective film. That is, the ground terminal 5, feed terminal 6 and antenna branches 7 are all covered with protective film. The planar antenna 4 is designed based on Zigbee and has an operating frequency of 2.4 GHz to 2.46 GHz.

In this embodiment, the size of the antenna housing 2 is smaller than the size of the metal shell 1. The antenna housing 2 is sleeved into the metal shell 1, and the gap 2A of 2 mm to 3 mm is there between.

In this embodiment, the metal shell 1 is made of metal or has surfaces treated with metal material. The antenna housing 2 may be made of metal, or plastic such as polyethylene, polypropylene, polyvinyl chloride, polystyrene, and acrylonitrile-butadiene-styrene copolymer, and/or have surfaces treated such as sprayed or electroplated with a metal material, so that the surfaces have a metallic finish.

In other embodiments, if the bending part of the planar antenna 4 is longer, or longer than a edge of the housing 3, the bending part of the antenna can be bent several times, so that the ground terminal 5 and the feed terminal 6 are folded onto the inner surface of the housing 3, and the antenna branch 7 is pressed onto the outer surface of the housing 3.

In this embodiment, as shown in FIG. 2, the antenna housing 2 is surrounded by the metal shell 1. The gap 2A with the width about 2.5 mm between the metal shell 1 and the antenna housing 2. The planar antenna 4 can radiate through the gap 2A. Because the antenna is designed in the form of a PIFA, the planar antenna 4 further has a ground terminal 5 in addition to a feed terminal 6.

In some embodiments, the gap 2A may be different sizes to adapt to different frequencies. For example, the gap 2A may be 2 mm or 3 mm to have optimized radiation effects.

In some embodiments, the metal shell 1 may have a slot 1A for improved radiation performance. The slot 1A on the metal shell 1 may have different sizes to adapting to different frequencies. For example, the slot 1A may be 2 mm or 3 mm to have optimized radiating effects. There may be a plurality of slots and have additional functions such as heat dispatch.

In some embodiments, the slot 1A of the metal shell 1 may be designed to resonate with the planar antenna 4 and act as part of the planar antenna 4. Furthermore, the slot 1A corresponds to the antenna branches to have optimized radiating effects. The slot 1A may partially or completely reveals the antenna branches 7 of the planar antenna 4. The quantities, positions and sizes of the slot 1A may vary depending on the design requirements and optimal performance.

Figure 5:
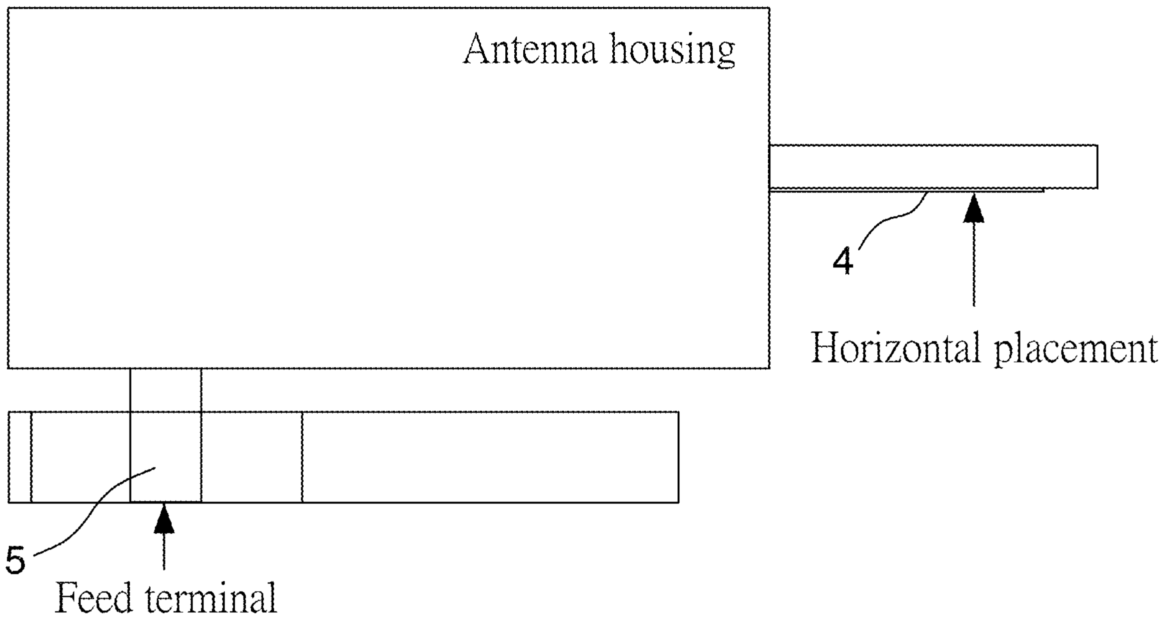
FIG. 5 is a diagram of a horizontally placed antenna (hard board)

In some embodiments, as shown in FIG. 5, the feed terminal 5 of the planar antenna 4 is in a horizontal plane, but the majority of the planar antenna 4 in a vertical plane perpendicular to the upper cover. Therefore, bendable LCP material is more suitable for such antenna design as compared to the conventional hard FR4 material.

Furthermore, the planar antenna 4 is bent, the ground terminal 5 and the feed terminal 6 are folded onto the inner surface of the housing 3, and the antenna branch 7 is pressed onto the outer surface of the housing 3.

Figure 6:
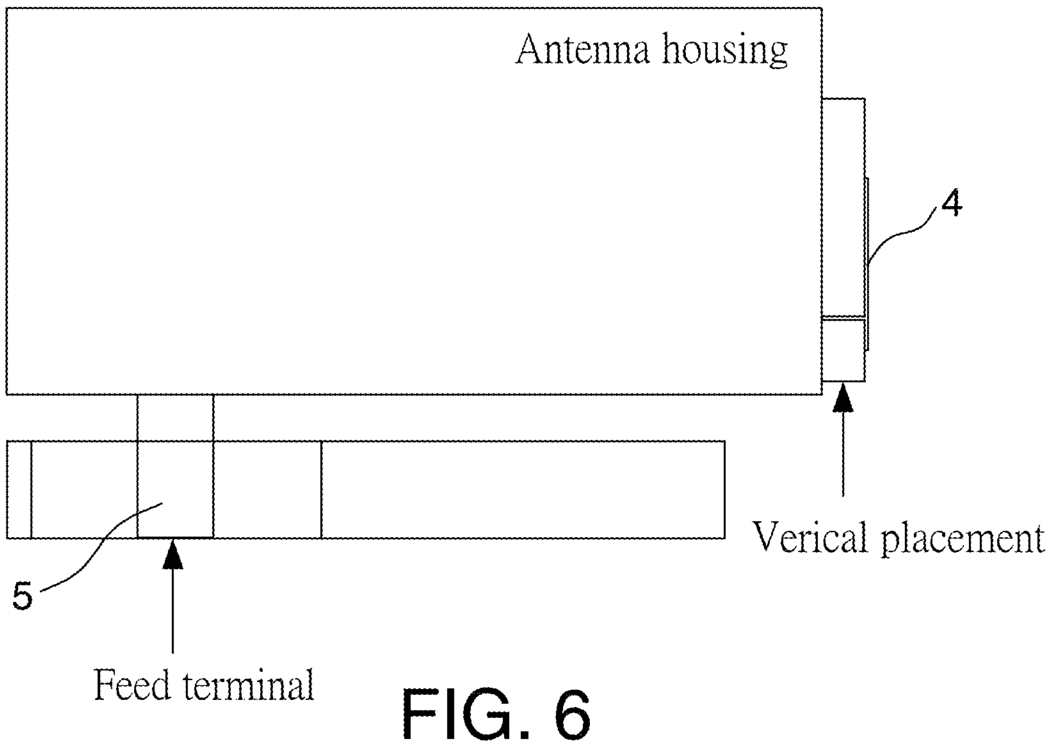
FIG. 6 is a diagram of a vertically placed antenna (soft board)

In this embodiment, as shown in FIG. 5, the planar antenna 4 may only be placed horizontally when designed with a conventional hard board. In contrast, the planar antenna 4 may be bent and placed vertically as shown in FIG. 6. The planar antenna 4 is disposed between the metal shell 1 and the antenna housing 2, and close to the gap 2A to improve radiation ability of the planar antenna 4.

In this embodiment, when the housing 3 is sleeve fitted to the metal shell 1, the antenna branch 7 is pressed onto the outer surface of the housing 3, and the antenna branch 7 is aligned with the gap 2A. The feed position of the planar antenna 4 is inside the housing 3, and the planar antenna 4 is turned into a vertical plane after reaching an edge along the housing 3, to be approximate to the gap 2A on the metal shell 1 for improved radiation.

In this embodiment, in an all metal shell, by using the soft board LCP, the planar antenna 4 is designed into a planar inverted-F antenna and has an operating frequency of 2.4 GHz to 2.46 GHz.

Figure 7:
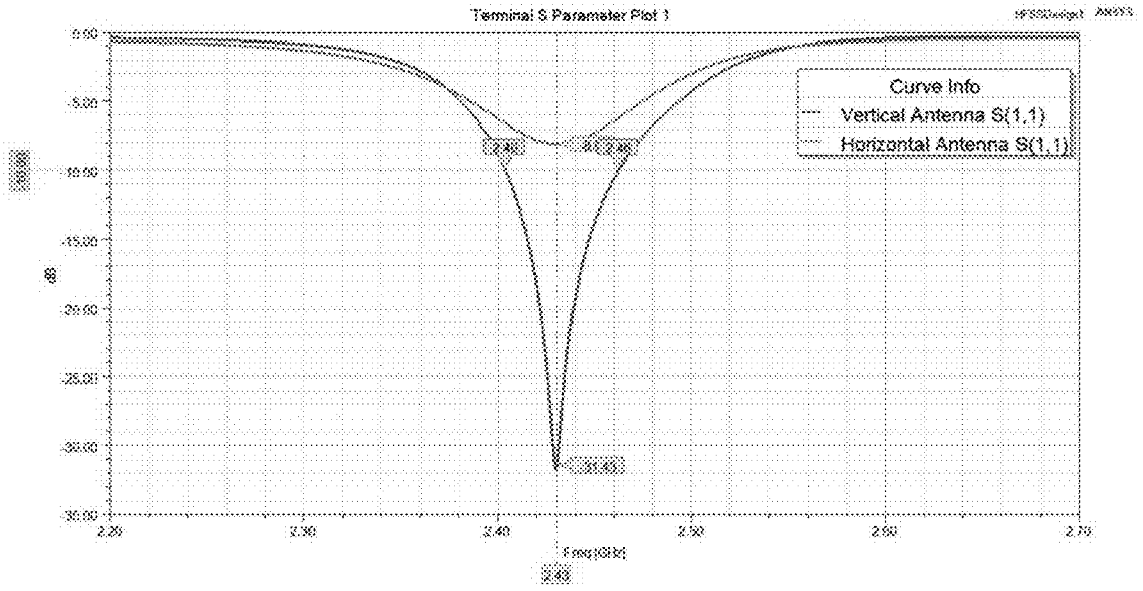
FIG. 7 is a frequency response diagram of an antenna return loss.
Figure 8:
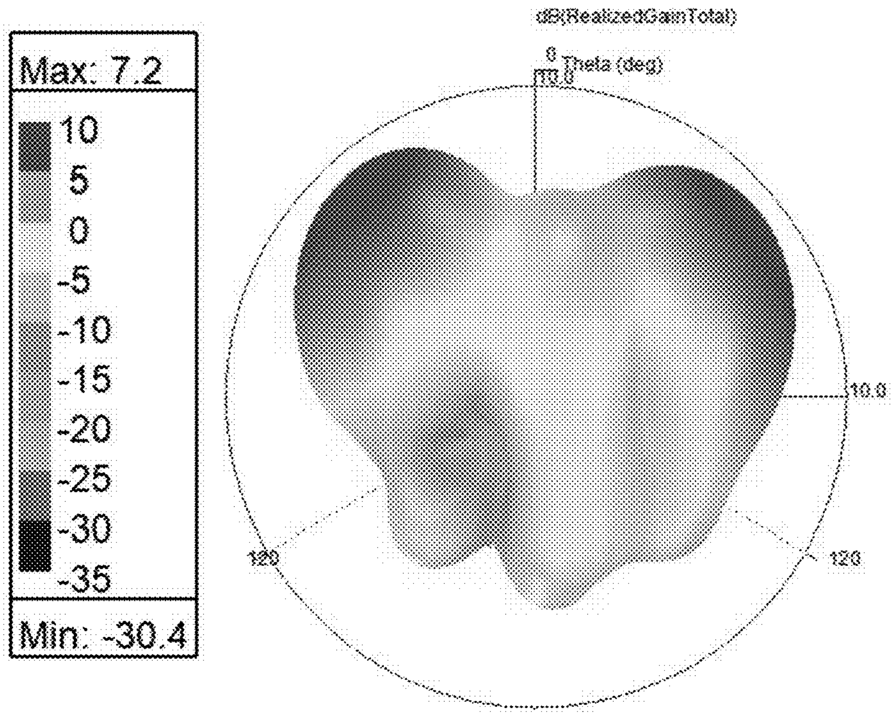
FIG. 8 is a 3D radiation pattern of an antenna gain.

In this embodiment, the antenna has a center frequency of 2.43 GHz, a return loss of −31.43 dB, and a bandwidth of 2.46%. The simulation response diagram of the antenna is shown in FIG. 7. Through a comparison between the planar antenna 4 being placed horizontally with the hard board and being placed vertically with the soft board, the vertical placement of the planar antenna 4 with the soft board has better antenna matches. FIG. 8 shows a 3D field radiation pattern of the planar antenna 4 at 2.4 GHz surrounded by metal shell 1, the antenna gain reaches 7.2 dBi. The results indicate that the planar antenna structure according to the present invention works effectively in an all metal environment.

In this embodiment, the planar antenna 4 is designed into the planar inverted-F antenna (PIFA). There are a feed terminal 6 and a ground terminal 5 in a feed plane. In this embodiment, the feed terminal 6 has a longer path than that of the ground terminal 5. Most of the antenna structure is vertically disposed and there are two branches 7 at the tail end of the planar antenna 4. The main function of the branches 7 is to match the antenna. The antenna branches 7 are pressed to the outer surface of the housing 2 and aligned with the gap 2A. The gap 2A partially or completely exposes the antenna branches 7 for improved radiation.

In summary, the present invention provides the appressed antenna structure where the planar inverted-F antenna with the LCP material in a metal antenna housing 2. The ground terminal 5 and the antenna branch 7 at the tail end of the planar antenna 4 provide a good matching for the antenna. Because the LCP has the thermoplastic property, the antenna can be bent and arranged on different dimensions.

In the present invention, the planar antenna 4 is bent, so that the planar antenna 4 may be close to the gap 2A to improve the radiation efficiency of the planar antenna 4. The LCP material provides the advantage of being bendable, and further provides low loss and a low water absorption properties, so that the appressed antenna retains a good return loss.

What is claimed is:

1. An appressed antenna, including:

an antenna housing, comprising a housing and a planar antenna, wherein the antenna housing has a plurality of sidewalls defining a trough, each of the sidewalls has an inner surface and an outer surface opposite to each other, the inner surface faces the trough, the outer surface is away from the trough, part of the planar antenna is pressed onto the outer surface of one of the sidewalls, and the other part is extended along the one of the sidewalls and folded onto the inner surface of the one of the sidewalls; and a metal shell, being larger than the antenna housing, and the antenna housing is sleeved into the metal shell, and a distance between the antenna housing and the metal shell is greater than 0.

2. The appressed antenna of claim 1, wherein a distance between the antenna housing and the metal shell is between 2 mm and 3 mm where the planar antenna is disposed.

3. The appressed antenna of claim 1, wherein the metal shell is made of metal or surface treated with metal material.

4. The appressed antenna of claim 1, wherein the planar antenna is an inverted-F shaped and contains Liquid crystal polymer (LCP) material.

5. The appressed antenna of claim 1, wherein the planar antenna comprises of a ground terminal, a feed terminal and a plurality of branches.

6. The appressed antenna of claim 5, wherein the planar antenna is bent, the ground terminal and the feed terminal are folded onto the inner surface of the housing, and the plurality of branches are pressed onto the outer surface of the housing.

7. The appressed antenna of claim 5, wherein at least the ground terminal, feed terminal and branches of the planar antenna are wrapped with protective film.

8. The appressed antenna of claim 1, wherein the planar antenna is designed based on Zigbee.

9. The appressed antenna of claim 1, wherein an operating frequency of the planar antenna is 2.4 GHz to 2.46 GHz.

10. The appressed antenna of claim 1, wherein at least one slot is opened on the metal shell for radiation of signal waves.

11. The appressed antenna of claim 10, wherein the slot opened on the metal shell exposes at least part of branches of the planar antenna when the antenna housing and the metal shell are sleeve fitted.

12. The appressed antenna of claim 11, wherein the width of the slot is 2 mm to 3 mm.

* * * * *